(12) United States Patent
Choi et al.

(10) Patent No.: US 7,584,818 B2
(45) Date of Patent: Sep. 8, 2009

(54) ELECTRIC POWER STEERING APPARATUS EQUIPPED WITH STEERING ANGLE SENSOR

(75) Inventors: Jung-rak Choi, Yongin-si (KR); Jun-gyu Song, Seongnam-si (KR)

(73) Assignee: Mando Corporation, Pyeongtaek-si (KR)

( * ) Notice: Subject to any disclaimer, the term of this patent is extended or adjusted under 35 U.S.C. 154(b) by 527 days.

(21) Appl. No.: 11/387,519

(22) Filed: Mar. 23, 2006

(65) Prior Publication Data
US 2007/0169986 A1    Jul. 26, 2007

(30) Foreign Application Priority Data
Jan. 26, 2006    (KR) .................. 10-2006-0008466

(51) Int. Cl.
    *B62D 5/04*    (2006.01)
(52) U.S. Cl. ...................... 180/444; 180/446
(58) Field of Classification Search ............. 180/444, 180/446
    See application file for complete search history.

(56) References Cited

U.S. PATENT DOCUMENTS

| | | | | |
|---|---|---|---|---|
| 5,235,316 | A | * | 8/1993 | Qualizza .................. 340/436 |
| 5,423,391 | A | * | 6/1995 | Shimizu .................. 180/446 |
| 6,523,637 | B1 | * | 2/2003 | Nakano et al. ............ 180/402 |
| 2004/0045182 | A1 | | 3/2004 | Freitag et al. |
| 2005/0194333 | A1 | * | 9/2005 | Veiner et al. ............. 211/74 |

FOREIGN PATENT DOCUMENTS

| | | |
|---|---|---|
| EP | 0670474 A1 | 9/1995 |
| EP | 1018466 A2 | 7/2000 |
| EP | 1332943 A1 | 8/2003 |
| JP | 2000-203443 | 7/2000 |
| JP | 2000-296781 | 10/2000 |
| JP | 2002-213910 | 7/2002 |
| JP | 2003-307419 | 10/2003 |
| JP | 2003-329436 | 11/2003 |

* cited by examiner

*Primary Examiner*—Lesley D. Morris
*Assistant Examiner*—Daniel Yeagley
(74) *Attorney, Agent, or Firm*—Lahive & Cockfield, LLP; EuiHoon Lee

(57) ABSTRACT

Disclosed is an electric power steering apparatus including a steering shaft connected to a steering wheel of an automobile; a reduction shaft adapted to engage with the steering shaft and rotate; a direction sensor having a transmitter and a receiver; a rotation member formed on an end of the reduction shaft and positioned between the transmitter and the receiver; a motor for supplying steering power; a motor position sensor positioned on the motor to sense a rotational angle of a motor shaft; and an electronic control unit adapted to receive electric signals from the direction sensor and the motor position sensor, respectively, and calculate a steering angle. The electric power steering apparatus is equipped with a steering angle sensor adapted to sense an absolute steering angle using a direction sensor for sensing the rotational direction of a steering shaft and a motor position sensor for sensing the rotational position of a motor shaft. This reduces the manufacturing cost of the steering apparatus.

4 Claims, 5 Drawing Sheets

US 7,584,818 B2

ELECTRIC POWER STEERING APPARATUS EQUIPPED WITH STEERING ANGLE SENSOR

RELATED APPLICATIONS

This application claims convention priority to Korean patent appln. No. 2006-0008466 filed on Jan. 26, 2006, the content of which is incorporated by reference.

FIELD OF THE INVENTION

The present invention relates to an electric power steering apparatus equipped with a steering angle sensor. More particularly, the present invention relates to an electric power steering apparatus equipped with a steering angle sensor adapted to sense an absolute steering angle using a direction sensor for sensing the rotational direction of a steering shaft and a motor position sensor for sensing the rotational position of a motor shaft.

DESCRIPTION OF THE PRIOR ART

As generally known in the art, power steering apparatuses for automobiles include a hydraulic power steering apparatus utilizing hydraulic pressure of a hydraulic pump and an electric power steering apparatus utilizing an electric motor, use of which has been gradually universalized since the 1990's.

In the case of the hydraulic power steering apparatus, the hydraulic pump, which is a power source for supplying steering power, is driven by an engine, which causes the hydraulic pump to continuously consume energy regardless of whether or not the steering wheel is being rotated. In the case of the electric power steering apparatus, when steering torque is generated by rotation of the steering wheel, the motor supplies steering power in proportion to the generated steering torque. Therefore, the electric power steering apparatus has higher energy efficiency than that of the hydraulic power steering apparatus.

FIG. 1 shows the construction of a conventional electric power steering apparatus.

As shown in FIG. 1, a conventional electric power steering apparatus includes a steering system 100, which includes elements leading from a steering wheel 101 to both wheels 108, and a steering power mechanism 120 for supplying steering power to the steering system 100.

The steering system 100 includes a steering shaft 102 having an upper end connected to the steering wheel 101 and a lower end connected to a pinion shaft 104 via a pair of universal joints 103, so that the steering shaft 102 rotates together with the steering wheel 101. The pinion shaft 104 is connected to a rack bar 109 via a rack-pinion mechanism 105. Both ends of the rack bar 109 are connected to the wheels 108 of the automobile via tie rods 106 and knuckle arms 107.

The rack-pinion mechanism 105 includes a pinion gear 111 formed on the lower end of the pinion shaft 104 and a rack gear 112 formed on one side of the outer peripheral surface of the rack bar 109 to engage with the pinion gear 111. The rack-pinion mechanism 105 converts the rotational motion of the pinion shaft 104 into a linear motion of the rack bar 109. Particularly, when the driver operates the steering wheel 101, the pinion shaft 104 rotates accordingly. The rotation of the pinion shaft 104 causes the rack bar 109 to move linearly in the shaft direction. The linear motion of the rack bar 109 is transmitted to and thereby operates the wheels 108 via the tie rods 106 and the knuckle arms 107.

The steering power mechanism 120 includes a torque sensor 121 for sensing steering torque applied to the steering wheel 101 by the driver and outputting an electric signal in proportion to the sensed steering torque, an ECU (Electronic Control Unit) 123 for generating a control signal based on the electric signal from the torque sensor 121, and a motor 130 for generating steering power based on the control signal from the ECU 123.

The electric power steering apparatus is operated as follows: when the steering wheel 101 is rotated, steering torque is generated and transmitted to the rack bar 109 via the rack-pinion mechanism 105. In addition, the generated steering torque causes the motor 130 to generate steering power, which is transmitted to the steering shaft 102, the pinion shaft 104, or the rack bar 109. As such, the steering torque generated by the steering system 100 is combined with the steering power generated by the motor 130, so that the rack bar 109 is moved in the shaft direction.

The electric power steering apparatus has a steering angle sensor, which provides the ECU with information on the rotational angle or rotational angular velocity of the steering wheel with reference to a position for straight advancement of the running automobile. Using this information, the ECU controls the roll or yaw of the automobile.

FIG. 2 is a block diagram illustrating a conventional method for measuring a steering angle.

According to the conventional method for measuring a steering angle as shown in FIG. 2, a steering angle sensor 200, which uses an optical sensor and a slit disc, obtains steering information and transmits the information to the ECU 123, which then calculates the steering angle and steering angular velocity.

The conventional steering angle sensor 200, as shown in FIGS. 3 and 4, includes an optical sensor 301 and a slit disc 303. A column switch, which includes the optical sensor 301, is fixed to a steering column, and the slit disc 303 is positioned on the steering shaft 102 so that the slit disc 303 rotates together when the steering wheel is rotated.

The slit disc 303, which is positioned between a light emitting element 401 and a light receiving element 403 of the optical sensor 301, rotates together with the steering shaft 102 when the steering wheel is operated. In this regard, the properties of electrical signals are determined according to whether or not light from the light emitting element 401 reaches the light receiving element 403.

FIG. 5 shows the waveform of an electric signal outputted from the conventional steering angle sensor.

As shown in FIG. 5, the voltage of the electric signal changes according to whether or not light from the light emitting element reaches the light receiving element. When the electric signal reflecting such a change is transmitted to the ECU, it can measure the steering angle.

However, the conventional steering angle sensor has a problem in that it recognizes a steering angle of zero and that of ±360° (or ±720°) as the same angle. In other words, it cannot distinguish a left turn from a right turn.

In an attempt to solve this problem, an absolute steering angle may be measured by an absolute steering angle sensor, which has high resolution. However, the absolute steering angle sensor is expensive and increases the manufacturing cost of the steering apparatus employing it.

SUMMARY OF THE INVENTION

Accordingly, the present invention has been made to solve the above-mentioned problems occurring in the prior art, and an object of the present invention is to provide an electric power steering apparatus equipped with a steering angle sensor adapted to sense an absolute steering angle using a direction sensor for sensing the rotational direction of a steering shaft and a motor position sensor for sensing the rotational position of a motor shaft, in order to reduce the manufacturing cost of the steering apparatus.

In order to accomplish this object, there is provided an electric power steering apparatus including a steering shaft connected to a steering wheel of an automobile; a reduction shaft adapted to engage with the steering shaft and rotate; a direction sensor having a transmitter and a receiver; a rotation member formed on an end of the reduction shaft and positioned between the transmitter and the receiver; a motor for supplying steering power; a motor position sensor positioned on the motor to sense a rotational angle of a motor shaft; and an electronic control unit adapted to receive electric signals from the direction sensor and the motor position sensor, respectively, and calculate a steering angle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
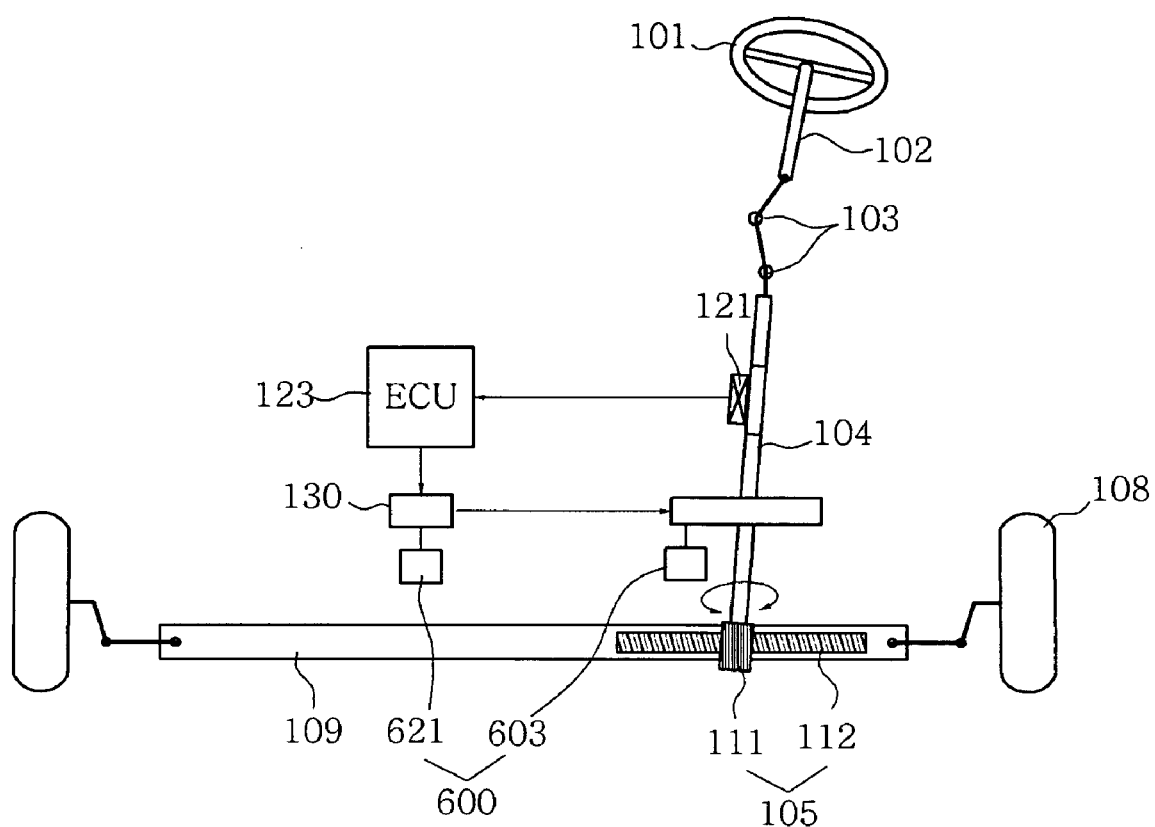
FIG. 1 shows the construction of a conventional electric power steering apparatus.
Figure 2:
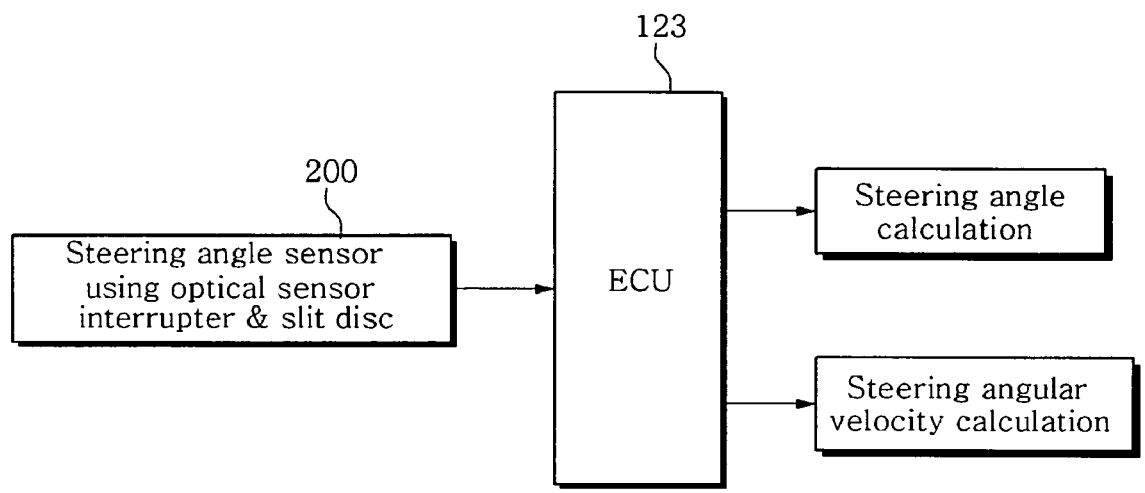
FIG. 2 is a block diagram showing a conventional method for measuring a steering angle.
Figure 3:
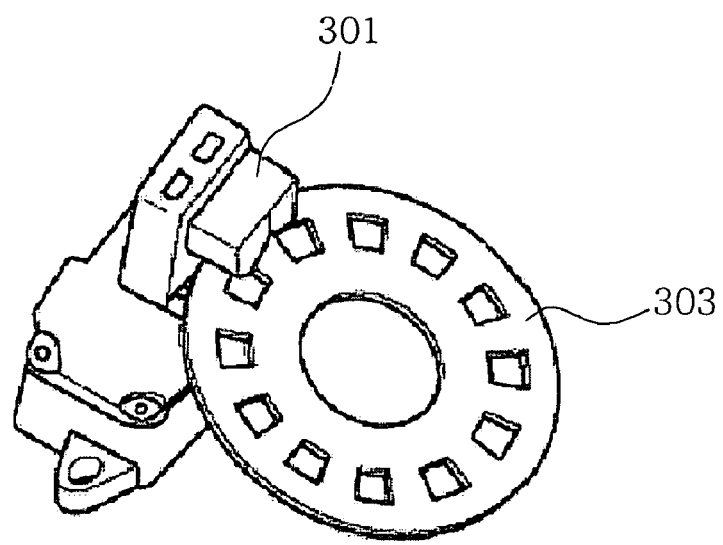
FIG. 3 briefly shows the structure of a conventional steering angle sensor.
Figure 4:
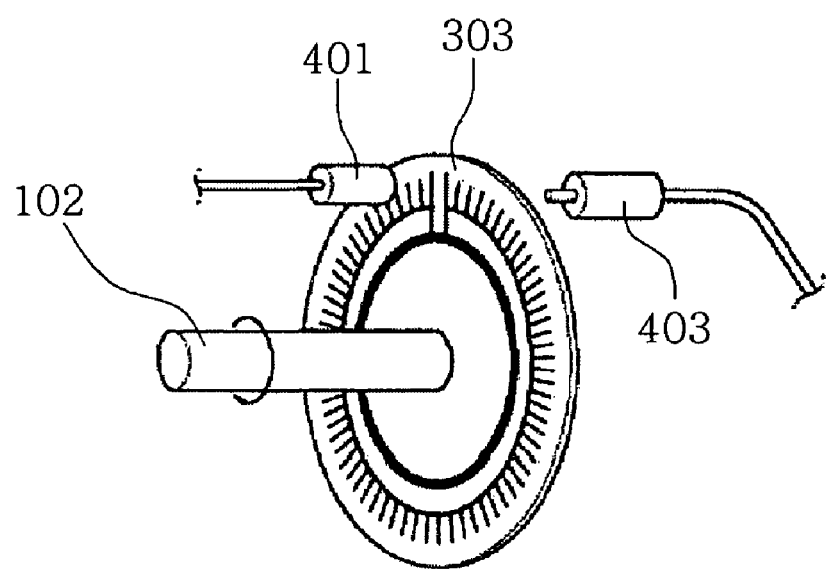
FIG. 4 briefly shows the operation principle of a conventional steering angle sensor.
Figure 5:
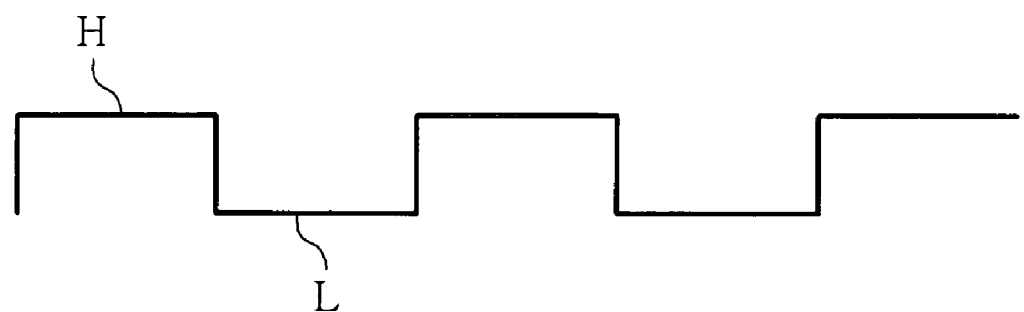
FIG. 5 shows the waveform of an electric signal outputted from a conventional steering angle sensor.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 6:
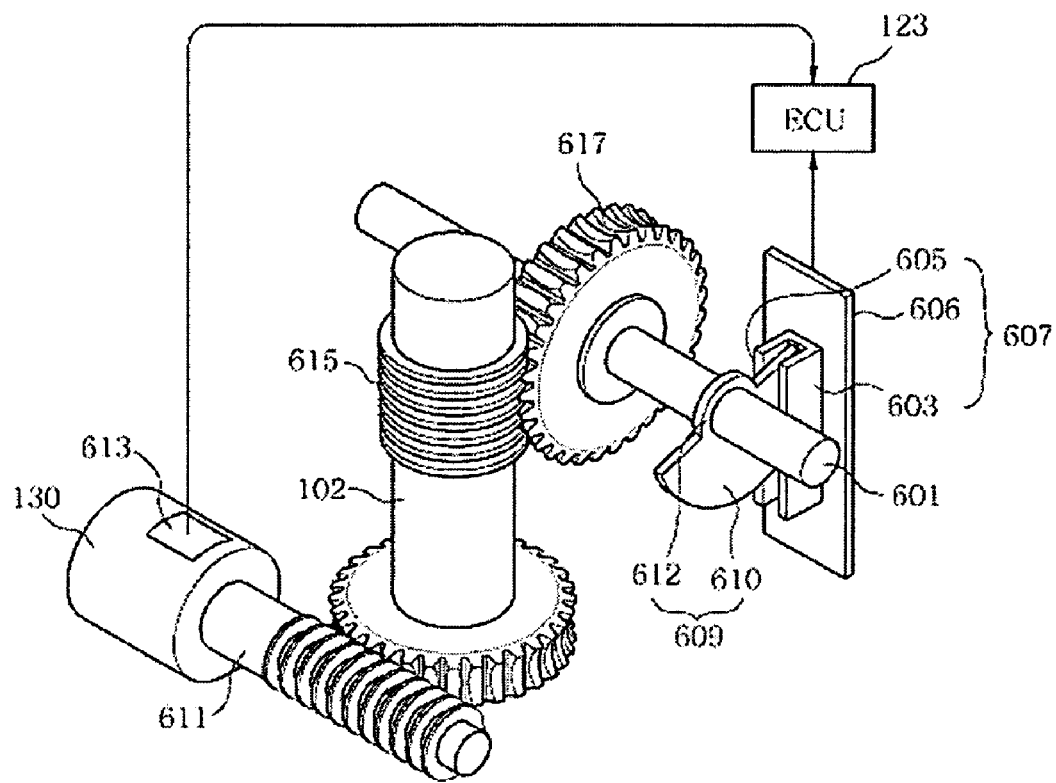
FIG. 6 shows the construction of an electric power steering apparatus according to a preferred embodiment of the present invention.

FIG. 6 shows the construction of an electric power steering apparatus according to a preferred embodiment of the present invention.

As shown in FIG. 6, the electric power steering apparatus according to a preferred embodiment of the present invention includes a steering shaft 102 connected to a steering wheel (not shown); a reduction shaft 601 adapted to engage with the steering shaft 102 and rotate; a direction sensor 607 having a transmitter 603 and a receiver 605; a rotation member 609 formed on an end of the reduction shaft 601; a motor 130 for supplying steering power; a motor position sensor 613 for sensing the rotational angle of a motor shaft 611; and an ECU 123 adapted to receive electric signals from the direction sensor 607 and the motor position sensor 613, respectively.

The steering shaft 102 is adapted to rotate when the driver rotates a steering wheel (not shown) and has a worm 615 formed on the outer peripheral surface thereof.

The reduction shaft 601 has a worm wheel 617 formed on the outer peripheral surface thereof, which engages with the worm 615.

In general, the steering shaft 104 is configured to rotate 3-4 times as the driver operates the steering wheel (not shown). According to the present invention, the reduction shaft 601 is preferably configured to rotate once at most, when the steering shaft 102 rotates 3-4 times, so that the calculated steering angle is no more than 360°.

Figure 7:
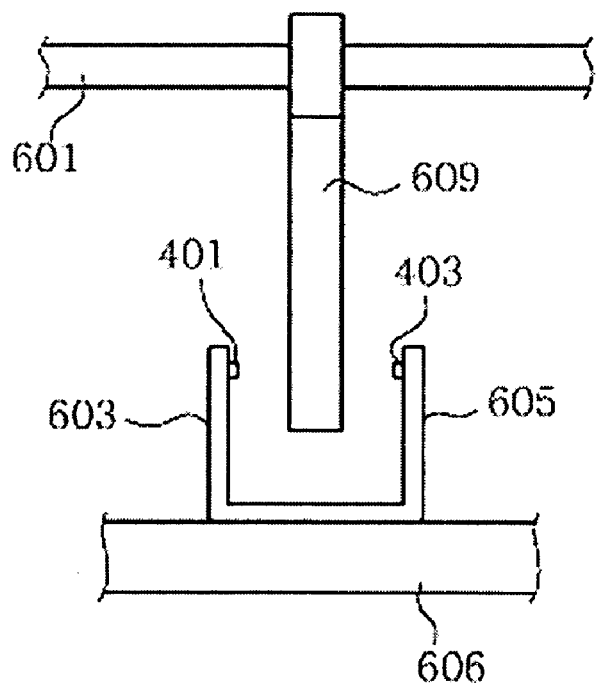
FIG. 7 is a sectional view showing a direction sensor.

FIG. 7 is a sectional view of the direction sensor.

As shown in FIGS. 6 and 7, the direction sensor 607 includes a transmitter 603, a receiver 605, and a circuit board 606.

The transmitter 603 and the receiver 605 face each other so that signals (e.g. electric, magnetic, or optical signals) are transmitted from the transmitter 603 to the receiver 605. The rotation member 609 is adapted to rotate between the transmitter 603 and the receiver 605 so that the signals from the transmitter 603 are interrupted or allowed to pass. The direction sensor 607 is operated in this manner.

The direction sensor 607 may be an optical sensor including a light emitting element 401 and a light receiving element 403. The light emitting element 401 may be an LED (Light Emitting Diode), and the light receiving element 403 may be a phototransistor, but the type is not limited to that herein.

The circuit board 606 is connected to the transmitter 603 and the receiver 605, respectively, and supplies the transmitter 603 with power. The circuit board 606 forwards a predetermined electric signal, which is generated when the receiver 605 receives or fails to receive signals from the transmitter 603, to the ECU 123. Generally, a PCB (Printed Circuit Board) is used as the circuit board 606, but the type is not limited to that herein.

The rotation member 609 is coupled to an end of the reduction shaft 601 so that the rotation member 609 rotates while being interlocked with the reduction shaft 601. The rotation member 609, which is positioned between the transmitter 603 and the receiver 605, includes a body 610 and a coupler 612.

The body 610, which may have a planar shape, is adapted to rotate between the transmitter 603 and receiver 605 of the direction sensor 607, in order to interrupt signals from the transmitter 603 or allow them to pass. When an optical sensor is used as the direction sensor 607, the body 610 must be made of an opaque material.

The body 610 preferably has a circular sectional shape, in order to minimize space occupied by the body 601, which rotates together with the reduction shaft 601. When the range of rotation of the reduction shaft 601 is limited to 180° in a clockwise or counterclockwise direction, the body 610 preferably has a sectional shape of a semicircle or sector.

The coupler 612 protrudes from one side of the body 610 and couples the rotation member 609 to the reduction shaft 601. The coupler 612 must be completely fixed to the reduction shaft 612, because the rotation member 609 is supposed to rotate while being interlocked with the reduction shaft 601.

Alternatively, the rotation member 609 may be integrally formed with the reduction shaft 601 without using a separate coupler 612.

The motor position sensor 613 is positioned on one side of the motor 130 and senses the rotational angle of the motor shaft 611. The motor position sensor 613 senses the rotational angle of the motor shaft 611 and periodically generates pulses, which are transmitted to the ECU 123.

The ECU 123 receives electrical signals, which have been converted from various type of information related to the automobile (e.g. speed, steering torque, and motor shaft position) by various sensors mounted on the automobile (e.g. speed sensor, torque sensor, and motor position sensor), and controls the motor.

In particular, the ECU 123 according to the present invention receives electric signals from the direction sensor 607, which senses the rotational direction of the steering shaft 102, and information on the amount of change in the rotational angle of the motor shaft 611 from the motor position sensor 613, in order to calculate a steering angle.

Figure 8A:
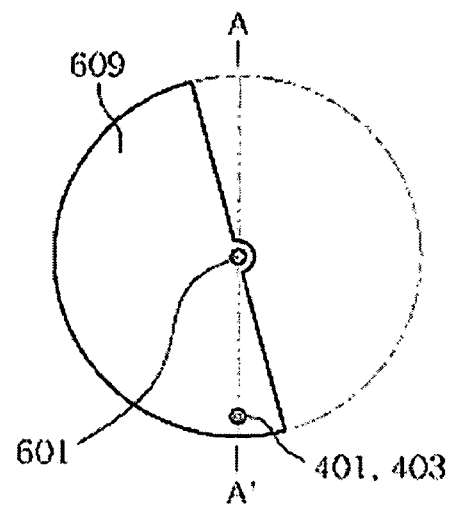
FIGS. 8A, 8B, and 8C are sectional views showing the operation of a direction sensor when a steering shaft rotates in one direction.
Figure 8B:
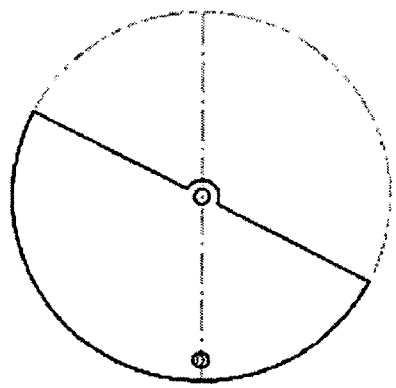
Figure 8C:
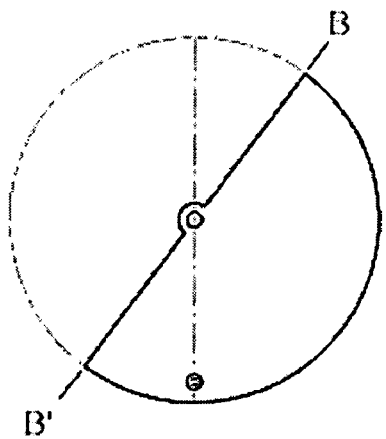

FIGS. 8A, 8B, and 8C are sectional views showing the operation of the direction sensor when the steering shaft rotates in one direction.

The operation of the electric power steering apparatus according to a preferred embodiment of the present invention will now be described with reference to FIGS. 8*a*, 8*b*, and 8*c*, based on an assumption that 3-4 times of rotation of the steering shaft is reduced to no more than 1 time of rotation of the reduction shaft.

Initially, the steering wheel of the automobile has been slightly rotated from a neutral position A-A'. The rotation member 609, which has been slightly rotated counterclockwise from the neutral position A-A' accordingly, is positioned between the light emitting element 401 and the light receiving element 403 and interrupts light from the light emitting element 401.

When the reduction shaft 601 rotates counterclockwise, the rotation member 609 rotates counterclockwise accordingly. However, light from the light emitting element 401 is still interrupted by the rotation member 609, even when the reduction member 609 reaches the final position B-B', and fails to be transmitted to the light receiving element 403. In this case, the direction sensor transfers a constant electric signal to the ECU.

Such a condition occurs when the driver operates the steering wheel for a left turn, for example, and the ECU recognizes that the steering wheel of the automobile is currently rotated left.

The motor position sensor periodically sends electric signals to the ECU, when the motor shaft rotates, and informs the ECU of the rotation angle of the motor shaft. When combined with the reduction ratio, the rotational angle of the motor shaft gives the rotational angle of the steering shaft. For example, when the rotation angle of the motor shaft sensed by the motor position sensor is 0.28° and the reduction ratio is 4:1, an absolute steering angle of 1.12 is obtained (0.28×4=1.12).

That is, electric signals from the direction sensor report the rotational direction of the steering shaft, and those from the motor position sensor report the rotational angle thereof. The combination of both gives the rotational direction of the steering shaft and the absolute rotational angle thereof in that direction.

The same principle holds when the steering shaft rotates in the opposite direction. More specifically, when the steering shaft, which has rotated in one direction, begins to rotate in the opposite direction past the neutral position, the rotation member rotates past the neutral position accordingly. As a result, light from the transmitter of the direction sensor is interrupted or allowed to pass, thereby causing instantaneous variance in the electric signal. Based on this variance, the ECU recognizes that the rotational direction of the steering shaft has been reversed.

As mentioned above, according to the present invention, the electric power steering apparatus is equipped with a steering angle sensor adapted to sense an absolute steering angle using a direction sensor for sensing the rotational direction of the steering shaft and a motor position sensor for sensing the rotational position of the motor shaft. This reduces the manufacturing cost of the steering apparatus.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electric power steering apparatus for calculating a steering angle of a steering wheel, the apparatus comprising:
   a steering shaft connected to the steering wheel of an automobile;
   a reduction shaft engaged with the steering shaft and configured to rotate once at most with respect to an entire rotation range of the steering shaft;
   a direction sensor having a transmitter and a receiver for detecting a rotational direction of the steering shaft;
   a rotation member formed on an end of the reduction shaft and positioned between the transmitter and the receiver, wherein a rotation range of the rotation member is the same as a rotation range of the reduction shaft and an edge of the rotation member passes the transmitter and the receiver once within the rotation range of the rotation member so that the direction sensor detects the rotational direction of the steering shaft;
   a motor for supplying steering power;
   a motor position sensor positioned on the motor to sense a rotational angle of a motor shaft, the motor shaft being engaged with the steering shaft; and
   an electronic control unit receiving electric signals from the direction sensor and the motor position sensor, respectively, and calculating the steering angle of the steering wheel based on the rotational direction of the steering shaft and the rotational angle of the motor shaft.

2. The electric power steering apparatus as claimed in claim 1, wherein the rotation member has a semi-disc shape.

3. The electric power steering apparatus as claimed in claim 1, wherein the reduction shaft is adapted to rotate up to 360°.

4. The electric power steering apparatus as claimed in claim 2, wherein the reduction shaft is adapted to rotate up to 360°.

* * * * *